No. 882,437. PATENTED MAR. 17, 1908
T. WHITEHORN.
AUTOMATIC WEIGHING MACHINE.
APPLICATION FILED APR. 24, 1907.
2 SHEETS—SHEET 2.
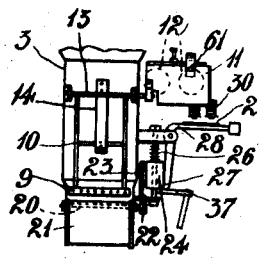
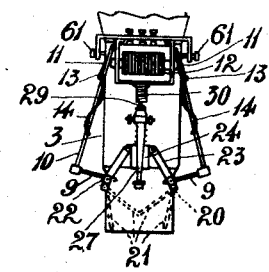
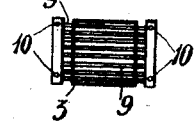
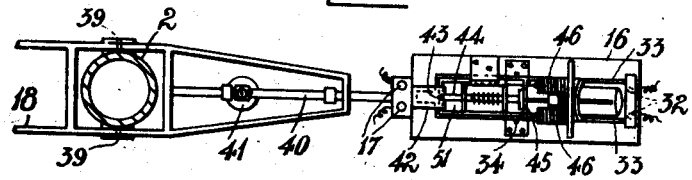
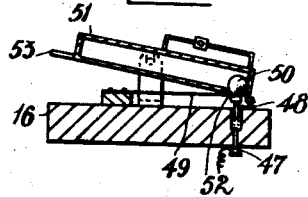
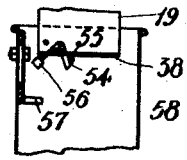
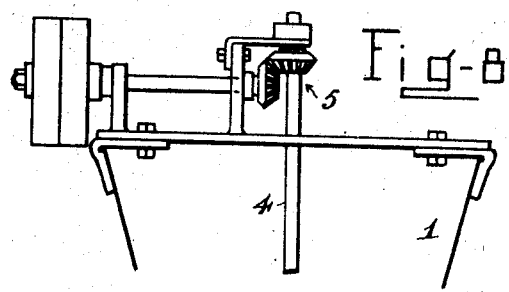
Witnesses
William G. Holden
Reginald W. Nicholls
Inventor
Thomas Whitehorn
by Edw<sup>d</sup> Waters & Sons
Attorneys

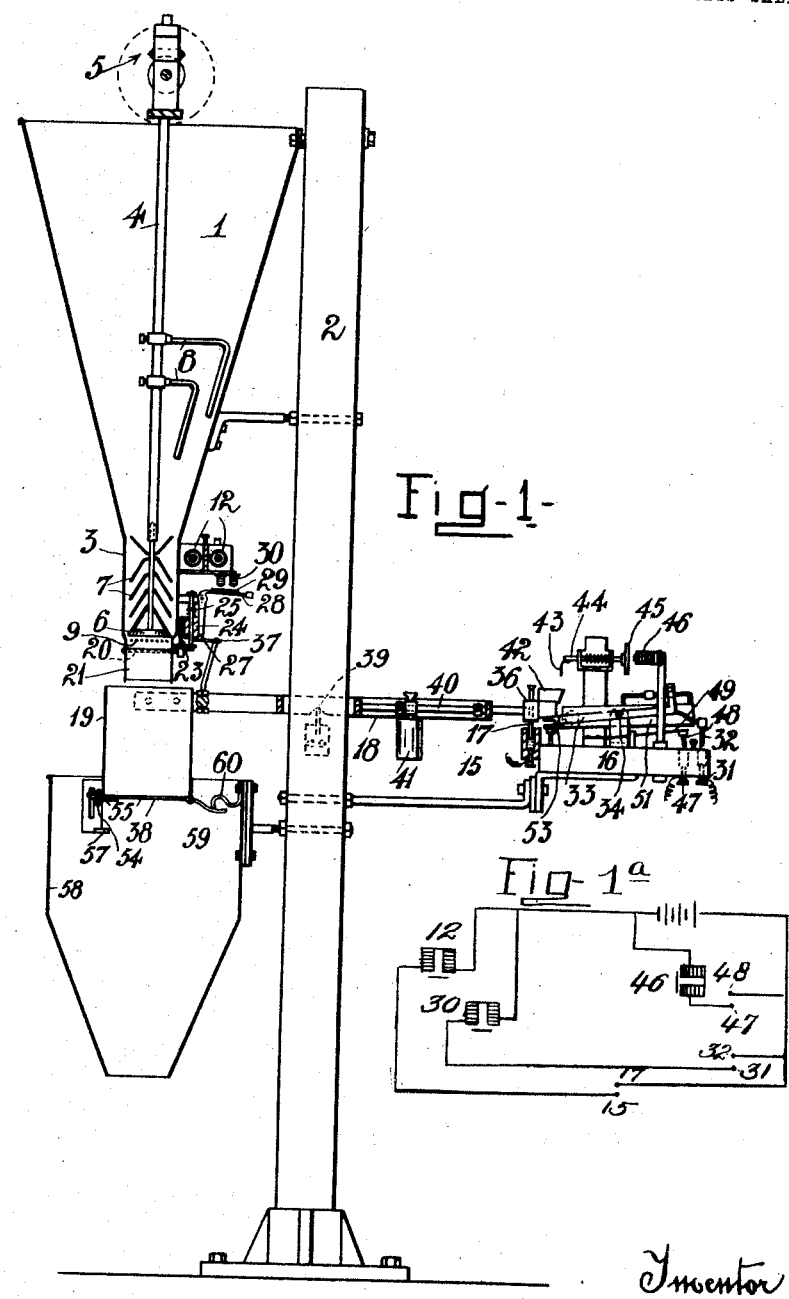

UNITED STATES PATENT OFFICE.

THOMAS WHITEHORN, OF COBURG, VICTORIA, AUSTRALIA.

AUTOMATIC WEIGHING-MACHINE.

No. 882,437.   Specification of Letters Patent.   Patented March 17, 1908.

Application filed April 24, 1907. Serial No. 370,066.

*To all whom it may concern:*

Be it known that I, THOMAS WHITEHORN, a subject of the King of Great Britain, residing at 19 Munro street, Coburg, in the State of Victoria, Australia, mechanic, have invented an Improved Automatic Machine for Weighing Tea, Flour, and such Like Substances, of which the following is a specification.

This invention consists in a machine for automatically weighing tea, flour and such like substances, and discharging them into receptacles conveniently situated near the machine.

With machines at present in use for this purpose it is difficult to obtain the correct weight as the cut-off has generally to act against the full feed and the slightest error in the adjusting of same involves a comparatively large one in the weight of the substance. It is mainly with the object of more efficiently overcoming this defect that I have devised the present invention whereby the rate of discharge of the material is reduced when the quantity is approximating the required amount. I attain this object by the use of a grid which automatically moves across the discharge end of the supply hopper and considerably restricts the rate of discharge of material into the weighing receptacle. Upon the desired quantity being measured in the latter the discharge of the material is stopped by spring doors and then the bottom of the weighing receptacle is opened and the weighed contents discharged when said receptacle automatically returns to be again filled and both the grid and spring doors are opened again.

The whole of the mechanism with the exception of that operating the feeding and stirring device, is controlled by electro-magnets, the circuits of which are completed by the oscillation of the balance weighing lever, and the only labor necessary to work the machine is that of feeding the material into the hopper and removing the bags, cartons or the like into which the weighed quantities are fed.

The invention will now be described in detail with the aid of the accompanying drawings which comprise:—

Figure 1 a vertical section (partly in elevation) of the whole machine showing the parts in position for starting. Fig. 1ª is a diagrammatic view of a full electric circuit used with the structure shown in Fig. 1.

Fig. 2 a front elevation of portion of the machine, Fig. 3 a similar side elevation thereof: Fig. 4 a horizontal section showing the grid in its closed position. Fig. 5 a plan of the right hand half of the machine. Fig. 6 a vertical section showing one form of contact making device employed. Fig. 7 a vertical section through the discharge chute showing the catch that holds the hinged bottom of the weighing receptacle, and Fig. 8 a vertical section through the upper end of the hopper showing the mechanism for driving the feeding and stirring device.

It will be noticed by reference to the above described drawings, that Fig. 1 is drawn to a smaller scale than the other figures.

According to this invention there is a conveniently shaped supply hopper 1 secured to a standard 2 and which is provided with both feeding and stirring mechanism by means of which the material is forced down to the discharge end 3 of said hopper. Said mechanism comprises a vertical shaft 4 rotated by any suitable gearing 5 as shown in Figs. 1 and 8, and provided at its lower end with blades 6 or with projecting arms 7 bent either downwardly or upwardly. In addition to such mechanism it is preferred to employ other stirrers when weighing finely grained material such as flour in order to prevent same clogging in the hopper. These consist of adjustable stout arms 8 projecting radially and bent at their ends which are secured to the shaft 4 at any height preferred.

Below the above mechanism and near the lower end of the discharge end 3 of the hopper, which is preferably squared is a grid 9, 9 made by preference in two parts and comprising a number of horizontal bars connected together at their outer ends and which are adapted to slide through holes in the sides of the hopper. The spaces between the bars of the grid are regulated to suit the class of substance being weighed. Each grid is rigidly attached at one end of a frame or lever 10, the other end of which consists of a flat metal plate 11 and forms the armature of a pair of electro-magnets 12, 12 (Figs. 2 and 3). The levers are pivoted on bars 13 journaled on the front and rear of the hopper and are moved in one direction by the electro-magnets 12, 12 and in the opposite direction by springs 14 secured to the hopper and bearing against the lower arms 10 of said levers. The swing of the grids is regulated by a pair of adjustable stops 61 against which the armature 11 abuts when released by the electro-magnets 12, 12. When the electro-magnets are energized the armature 11 is attracted and the grids 9, 9, are opened or separated as in Fig. 3, but when the electric current is broken the spring 14 forces the two parts of the grid together as in Fig. 4.

The current of the electro-magnets is cut off by the breaking of a contact, one pair of points 15 of which are formed on a bracket or contact making board 16 on the standard 2 while the other pair of points 17 are formed on the ends of the balance lever 18 which end is the opposite to that on which the weighing receptacle 19 is secured. It will thus be seen that the electro-magnets 12, 12 are cut out of circuit when the end of the lever 18 rises.

At the lower squared end of the hopper two of the sides are hinged on rods 20 and adapted to form doors 21, 21 controlled by spring 26 which is employed for temporarily closing the hopper when the desired weight of material is passed into the weighing receptacle. The hinge rods 20 are provided with arms 22 which in conjunction with each door forms a lever which is connected by a link 23 to a spring block 24 adapted to slide on a vertical rod 25 on the side of the hopper. Said block is supported and held up against the pressure of its spring 26 by a trigger 27 formed on one end of a pivoted lever 28, the other end of which is bent and over-balanced and provided with an armature 29 adapted to be operated by a pair of electro-magnets 30, 30 on the hopper which are put in or out of circuit by two pairs of contact points 31, 32. One of each pair of points 31 is formed on the bracket 16 and the other 32 on an over-balanced lever 33 fulcrumed on a pivot 34 on the bracket and bearing at its other end against the underside of an enlargement 36 on the end of the balance lever 18. Such contact is thus only made and the electro-magnets energized when the lever 33 is permitted to fall by the raising of the right hand or weighted end of the balance lever 18. When the armature 29 is attracted by the electro-magnets 30 the trigger 27 is released, and the block 24 springs downwardly thus closing the doors 21, 21 as shown by dotted lines in Fig. 3. The doors are opened again by a bifurcated arm 37, on the opposite end of the balance lever, striking against the underside of the block 24 and compressing its spring 26 and approximately at the same time the weighted end of the balance lever strikes the lever 33 and breaks the contact 31, 32 of the electro-magnets 30 so that the over-balanced lever 28 falls free and its trigger 27 engages the block 24 and holds the hinged doors 21, 21 of the hopper open.

The material receptacle 19 has a hinged bottom 38 and is secured to the bifurcated end of the balance lever 18 which is fulcrumed as at 39 to the standard 2. On the end of the balance lever, opposite to that of the receptacle, is a horizontal bar 40 along which slides an adjustable balance weight 41. Upon the enlargement 36 on the weighted end of the lever is a block 42 which when rising abuts against a downwardly extending stop 43 formed on the end of a spring controlled horizontal rod 44, suitably journaled on the bracket or contact making board 16 which rod is provided with an armature 45 under the control of a pair of electro-magnets 46, 46. Connected with the latter are contacts one point 47 of which is formed on the bracket and the others 48 on a spring 49 by which the contact is normally broken as in Fig. 1.

The contact maker comprises a heavy metal ball 50 adapted to roll from one end to the other along an adjustably over-balanced tube 51 fulcrumed on the pivot 34 and provided with a hole 52 on its underside above the contact 48 on the spring 49. A projecting arm 53 on the end of said tube lies beneath one end of the lever 33 so that the pressure of the enlargement 36 on the end of the balance lever normally keeps it down and the contacts broken. When the enlargement of the balance lever rises the end of the tube 51 falls (Fig. 6) and the ball 50 rolls to said end and dropping partially through the hole 52 in the tube depresses the spring 49 thus making the contact 47, 48 and energizing the electro-magnets 46, 46. The armature 45 is thus attracted and draws the stop 43 free of the block 42 which then rises and permits the contact 31, 32 to be made for the purpose heretofore described. The above described stop 43 in conjunction with the rolling ball contact maker accomplishes a very important function in the operation of the machine, its object being to overcome the force of material pouring rapidly into the weighing receptacle when the desired weight is almost obtained. The force of the falling material would tilt the balance lever sufficiently far to make the contact 31, 32 and close the hopper doors 21, 21 before the required weight was obtained if the electrically controlled stop 43 were not employed.

The weighted end of the balance lever rises very suddenly when the desired weight is nearly obtained and the function of the stop is to check same temporarily while the substance trickles slowly through the grid and the duration of said check is determined by the time taken for the ball 50 to roll from one end of the tube 51 to the other, when it makes the contact 47, 48, and the stop 43 is then withdrawn and the slowly trickling material causes the balance lever to rise slowly until the desired weight is obtained when the doors of the hopper are closed.

The receptacle 19 is provided on one side with a pivoted over-balanced hook or catch 54 (Figs. 1 and 7), adapted to engage a projecting pin 55 on the end of the hinged bottom 38. When said receptacle falls with its measured contents, the weighted end 56 of the catch contacts with an adjustable projecting arm 57 on the side of a chute 58 which frees said catch from the pin so that the hinged bottom swings down and allows the contents of the receptacle to be discharged through the chute into the bag carton or the like beneath. When the receptacle again rises by means of the counter-balance weight 41 a curved projection 59 on the hinged end of the bottom 38 contacts with a curved stop 60 on the side of the chute 58 and so swings said bottom up when the pin 55 thereon again engages with the catch 54.

The electric circuits are not shown in the drawings, but it is to be understood that the electro-magnets are energized by an electric current obtained from any suitable source of electric power. The contacts for directing the current to the magnets are preferably of the mercury well type.

The sequence of operations is as follows:— The machine is normally in the position shown in Fig. 1 that is with the bottom doors 21, 21 of the hopper, and the grid 9, 9, open and the bottom 38 of the weighing receptacle 19 closed, said grid being kept open by the electro-magnets 12, 12 by reason of the contact 15, 17. The material is fed rapidly down into the receptacle by the rotating stirrers until the desired weight is nearly obtained when the weighted end of the balance lever 18 rises and causes the block 42 to abut against the stop 43 and temporarily check said lever 18. This rising movement breaks the contact 15, 17 and the grid 9, 9 closes by means of its springs 14 and only allows the material to trickle through at a comparatively slow rate. This rising movement also allows the rolling ball contact maker 50 and the lever 33 to tilt and the electro-magnets 46, 46 are put in circuit by the contacts 47, 48. These electro-magnets thus draw back the stop 43 and the balance lever 18 rises higher which allows the lever 33 to tilt further until the contact 31, 32 is made at which time the desired weight of material is in the receptacle. This latter contact throws the current into the electro-magnets 30, 30 which frees the trigger 27, and allows the spring block 24 to descend which closes the bottom doors 21, 21 of the hopper sharply. The receptacle continues to descend when its catch 54 is released and the bottom 38 opened so that the contents are discharged through the chute 58 into the bag carton or the like. When freed of its load the lever 18 returns by means of its balance weight 41, its bottom 38 is automatically closed by the arm 59 and stop 60 and the spring block 24 is raised by the bifurcated arm 37 on said lever which opens the bottom doors 21, 21 of the hopper. Approximately at the same time the descent of the weighted end of the balance lever causes the contact 31, 32 to be again broken which deënergizes the electro-magnets 30, 30 and allows the trigger 27 to fall into engagement with the block 24 and so hold the doors 21, 21 of the hopper open. The further descent of the balance lever 18 causes the ball contact maker 50 to tilt and break the contact 47, 48, thus cutting off the current from the electro-magnets 46, 46, and the stop 43 springs out and when the balance lever finally comes to rest the contact 15, 17 is restored, the electro-magnets 12, 12 energized and the grid 9, 9 again opened.

Having now particularly described and ascertained the nature of my said invention and in what manner the same is to be performed, I declare that what I claim is:—

1. An automatic machine for weighing tea, flour, and like substances, comprising a balance-lever, a weighing receptacle at one end thereof, an automatically controlled hinged bottom for the receptacle, a feed hopper above said receptacle provided at its discharge end with a movable grid, a pair of hinged doors below the latter, and automatic means for closing said grid prior to the closing of the doors.

2. In an automatic machine of the class described, a balance lever, a weighing receptacle at one end thereof, an automatically controlled hinged bottom for the receptacle, a feed hopper above said receptacle and having a feeding device therein and provided with a spring-operated grid, a pair of spring-controlled hinged doors below the grid, a series of electro-magnets adapted to be automatically energized by the tilting of the balance lever for holding said grid open and allowing said hinged doors to close.

3. In a machine of the class described, a hopper having in its discharge end a grid formed in two parts, springs for closing such parts, a pair of automatically controlled electro-magnets for opening said parts, a pair of spring-operated hinged doors situated below said grid and adapted to be opened by the balance lever, a pair of electro-magnets, contacts carried by the balance lever for engagement with the electro-magnets, and a trigger coöperative with the magnets to hold open the doors.

4. In a machine of the class described, a balance lever having contacts at one end and a receptacle at the other end, a feed hopper above said receptacle, a grid in the discharge end of said hopper and formed of two parts, spring-controlled pivoted levers connected with said parts, a pair of electro-magnets automatically controlled by the contacts and the balance lever for alternately opening and closing the two parts of said grid, substantially as described.

5. In a machine of the class described, a hopper, an automatically controlled movable grid in its discharge end, a pair of hinged doors below said grid, an arm on each door, a spring-controlled vertical sliding block, a link for connecting each arm with the block, a pivoted balance lever having a bifurcated arm for raising said block, a trigger for supporting said block, a pivoted over-balance lever carrying the trigger, an armature associated with the lever, and a pair of electro-magnets automatically controlled by the over-balance lever.

6. In a machine of the class described, a balance lever provided with a receptacle at one end, an automatically controlled hinged bottom for the latter, a hopper above said receptacle and having at its discharge end a movable grid, a pair of hinged doors below the grid, an adjustable weight and contact carried by said balance lever for controlling said grid, an enlargement on said lever, a pair of pivoted contact makers depressible by the enlargement, a stop, a block on said enlargement adapted when rising to temporarily abut against the stop, a spring-operated rod carrying the stop, and an armature carried by the rod and controlled by one contact maker, said other contact maker controlling the hinged doors of the hopper.

7. In a machine of the class described, a pivoted over-balance rolling ball contact maker, a balance lever having a weighted end adapted to bear upon the pivoted over-balance rolling ball contact maker, a laterally movable stop above said end, and a pair of electro-magnets in circuit and having contact points operated by said ball contact maker.

8. In a machine of the class described, an over-balance pivoted contact lever, a weighted end balance lever having an enlargement at its weighted end adapted to bear upon one end of the over-balance pivoted contact lever, spring-doors controlled by the over-balance lever, a pair of electro-magnets, a stop controlled by the latter and adapted to temporarily check the rising of the weighted end of the balance lever, and a rolling ball contact maker automatically causing the electro-magnets to be energized during the movement of the balance lever.

9. In a machine of the class described, a weighted end balance lever having an enlargement, an over-balance lever contact maker, a bracket for pivotally connecting the contact maker, said enlargement adapted to bear upon one end of said over-balance lever, a fulcrumed over-balance tube having an arm bearing against the under side of said lever contact maker, said tube having an opening, a ball adapted to roll inside said tube and extend partially through the opening therein, and a depressible spring contact point actuated by said ball.

10. In a machine of the class described, a contact maker, a balance-lever comprising a pivotal tube having a hole in its underside, a ball adapted to roll inside said tube, a pair of contact points beneath said hole and coöperative with the ball for automatically controlling the balance lever, and a spring coöperative with the contact points.

11. In a machine of the class described, a balance lever, a receptacle mounted on one end thereof and having a hinged bottom, a lateral pin associated with the bottom, an over-balance catch pivoted on said receptacle and engageable with the pin, a fixed projecting arm, the weighted end of said catch being adapted, when descending, to strike the arm to free said catch, a curved arm on the hinged end of said bottom, and a fixed stop coöperative with the arm to strike the latter when the bottom is rising to close said bottom.

12. In a machine of the class described, a feed hopper having a reduced discharge end, a rotatable shaft centrally arranged in said hopper, blades on the lower end of said shaft and having projecting bent arms, and bent arms adjustably secured to said shaft.

In testimony whereof I have hereunto set my hand in presence of two subscribing witnesses.

THOMAS WHITEHORN.

Witnesses:
  EDWARD WATERS,
  WALTER C. HART.